Patented July 23, 1929.

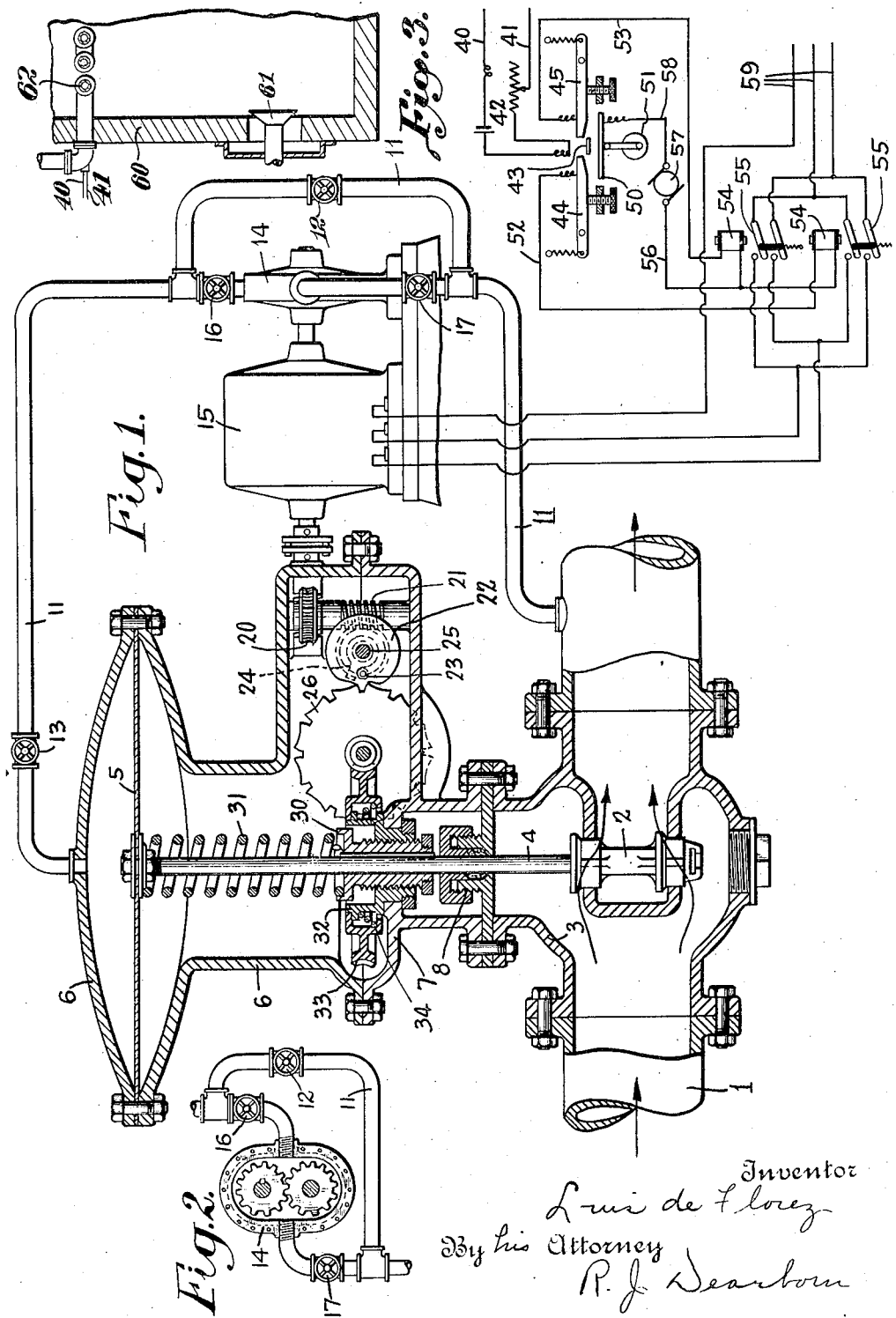

1,721,898

UNITED STATES PATENT OFFICE.

LUIS DE FLOREZ, OF POMFRET, CONNECTICUT, ASSIGNOR TO THE TEXAS COMPANY, OF NEW YORK, N. Y., A CORPORATION OF DELAWARE.

APPARATUS FOR FLOW CONTROL.

Application filed February 10, 1928. Serial No. 253,281.

This invention relates to means for controlling the supply of a fluid in a system in response to variations in the value of a condition; such control may be used to cause variations in the rate of flow which are functions of the variations in the value of a condition, or it may be used to maintain the rate of flow of the controlled fluid at a substantially uniform rate.

The condition, the values of which may be made effective to supervise or determine the control of the fluid flow in the system, may be the condition of pressure, or of temperature or of any other suitable factor. Variations in the value of such condition may either be dependent upon the variations in the flow of the controlled fluid, as for instance in the case of a pyrometer affected indirectly by variations in the flow of a fluid fuel, or the variations in the value of the condition may be wholly independent of any reaction resultant from the fluid flow.

Apparatus which may be suitable for effecting the purposes of my invention may constitute a suitable pipe or supply line for conducting the fluid to the point of use and in which the flow is controlled through means of a balanced diaphragm valve equipped with a pressure compensating connecting line between the diaphragm chamber and the delivery side of the valve to maintain substantially uniform flow through the valve regardless of pressure variations in the source of supply. Means may be provided for arbitrarily varying the rate of fluid flow by suitable actuation of a reversible pump connected on the one side to a supply of the fluid and on the other side to the diaphragm chamber. The reversible pump may be actuated by suitable means in response to changes in the value of a condition, such as that of temperature, and variations may thus be imparted to the rate of flow of fluid to bear any desired relationship to the changes in the condition. In the instance illustrated in the accompanying drawings, and specifically described herein, a liquid fuel is delivered to a furnace for combustion; suitable means is provided for reflecting changes in the temperature of the furnace, which changes are reflected in suitable impulses for the actuation of the pump so that fuel may be delivered to the furnace at a rate of flow adapted to maintain the furnace temperature approximately constant.

In accordance with my invention, the control of fluid flow is independent of any particular setting of the valve in the supply line inasmuch as the apparatus is adapted to operate directly to control the pressure head on the delivery side of the valve and consequently to control the primary factor which determines the rate of fluid flow. Stated otherwise, no attempt is made to specifically vary the port opening of the valve but the valve is made responsive to pressure on the delivery side in such manner that with a given setting of the control mechanism it tends to maintain a constant control pressure, the valve port opening automatically adjusting itself to whatever position may be required for the purpose. This invention may be regarded as a specific embodiment of the generic disclosure in my co-pending application Serial No. 82,865, filed January 21, 1926 and is particularly adapted for the automatic control of the flow of liquids.

A more thorough understanding of my invention may be derived by reference to the accompanying drawings in which Fig. 1 represents a diagrammatic illustration of suitable apparatus partially in section, Fig. 2 represents a partially sectional view of a portion of the apparatus illustrated in Fig. 1, and Fig. 3 represents a partially sectional view of a furnace, the temperature of which may be controlled.

Referring to the drawings, 1 indicates a supply line carrying the fluid whose rate of flow is to be controlled, the direction of flow being indicated by arrows. The balanced valve 2 is located in the supply line housed in its casing 3, the valve being illustrated in a partially open position. The valve 2 is suspended on valve stem 4 which is attached to and supported by the diaphragm 5 in the diaphram casing 6; the latter is secured rigidly to the housing 7, which in turn is supported upon the valve casing 3. The valve stem 4 is surrounded by a stuffing box 8, in the conventional manner, to prevent the leakage of fluid along the valve stem.

A pressure compensating line 11 is connected between the delivery side of the supply line 1 to the upper diaphragm chamber and is provided with suitable valves 12 and 13 to control the flow of fluid therethrough. A bypass is provided in connection 11 in which is located a reversible pump, such for example as a gear pump 14 operatively connected to a reversible motor, such as an electric motor 15. The by-pass may also be provided with valves 16 and 17 at opposite sides of the gear pump 14.

The motor 15 is also connected to a worm and gear train 20 and 21 which co-operates with a Geneva stop mechanism, consisting of Geneva stop pinion 22, pin 23, finger 24 and shaft 25, to which the finger 24 is keyed. The single tooth of the Geneva stop pinion 22 is designed to co-operate with the Geneva stop wheel 26 to move the same a fraction of a turn, and it will be observed that a further movement of the wheel 26 will only take place after a complete revolution of the finger 24 in either direction. On the valve stem 4 is slidably keyed a sleeve 30, the top of which is adapted to serve as a seat for one end of a compression spring 31, the other end of the spring 31 presses against the lower side of the diaphragm 5, while the coils of the spring encircle the valve stem 4. A member 32 is rotatably mounted on a portion of the casing 7, which serves as a bearing therefor. The member 32 is internally threaded to co-operate with the sleeve 30, which is externally threaded so that the member 32 may freely rotate to raise or lower the position of the sleeve 30. The gear wheel 33 rests on the upper side of a flange on the member 32, while the wheel 33 and member 32 are firmly but yieldingly held against each other by a stiff spring 34 compressed between the lower side of the flange and an extension of the wheel 33. The worm wheel 33 co-operates with a worm on the shaft of the Geneva stop wheel 26.

The control system for furnishing impulses for the operation of the foregoing mechanism is shown in the lower right hand portion of the drawing and comprises electrical conductors 40 and 41, over which may flow a current indicating the condition in response to which the control mechanism is to operate. These impulses arise from any suitable source, as for example a thermocouple, or from a pressure measuring instrument, or from any other suitable source.

In the specific illustration of my invention, the conductors 40 and 41 may be considered as leading from a thermocouple located in a furnace to which the supply line furnishes liquid fuel and is located at the point in the furnace whose temperature is to be regulated. Conductors 40 and 41 are connected to a galvanometer or potentiometer system shown diagramatically at 42 in the manner customary in the art. The galvanometer needle is indicated at 43 and is positioned so as to move in a horizontal plane. Switch members 44 and 45 are pivotally mounted within the range of movement of the galvanometer needle 43, but in a plane slightly above the plane in which the needle normally moves. The switch members are provided with adjustable stops against which they are normally held by springs or other resilient means. Below the galvanometer needle 43 is provided a chopper 50 operated continuously by any suitable mechanism shown diagrammatically at 51, periodically causing the chopper to be brought into contact with the needle 43, which in turn may strike one of the switch members 44 or 45 and deflect the same. This, of course, does not occur if the galvanometer needle 43 is in a central position between the members 44 and 45 corresponding to the predetermined or selected temperature. The members 44 and 45 are connected respectively to conductors 52 and 53, which in turn are connected to solenoids 54 adapted to close the switches 55. These switches are normally retained in open position by springs. The solenoids 54 have a common terminal which is connected by conductor 56 to one of the terminals of a source of electrical energy illustrated diagrammatically by the generator 57. The other terminal of the generator 57 is connected by conductor 58 to the chopper 50. Electrical energy is supplied from a source not shown through conductors 59 for the operation of the motor 15, passing through one or the other of switches 55 to control the direction of rotation.

In Fig. 3 the conductors 40 and 41 are shown connected to a thermocouple inserted in a heating coil 62 which may be mounted in a furnace 60 and heated by burner 61.

In the operation of the system, the changes in the value of the condition are reflected in the customary manner by variations in the position of the galvanometer needle 43, and by the periodical upward movement of the chopper 50 the galvanometer needle may be brought into contact with one of the switch members 44 or 45, depending upon the direction in which the needle has been deflected by a change in the condition. The contacting of chopper 50, galvanometer needle 43 and one of the switch members 44 or 45 closes one of the circuits through conductors 52 or 53 to energize one of the solenoids 54, which will in turn close the switch controlled by it.

It will be observed that the inner ends of the switch members 44 and 45 are curved upwardly and they thus give a period of contact which varies with the extent of the deflection of the galvanometer needle from its normal position representing the desired condition. Consequently, the periods of time for which the motor 15 is energized will be dependent upon the extent of the departure of the condition from that desired. The motor 15 will receive impulses in one direction or the other by the closing of one or the other of the switches 55 in response to the periodical contacting mechanism. When the motor 15 is thus energized, it is only for a short period of time, and liquid will temporarily be forced into or drawn from the upper diaphragm chamber through the line 11, which owing to the increase or decrease in pressure in the diaphragm chamber will effect a temporary movement of the valve 2 to decrease or increase the supply of liquid passing through the valve. The valve, however, will eventually be restored to normal position by reason of the equalization of pressure permitted through the valve 12. These momentary variations, therefore, serve the purpose of effecting temporary corrections in the supply of liquid passing through the valve 2. The valve 12 may be set in any desired position to permit the rate of equalization of pressure desired. The port opening of the valve 12, however, should preferably be such as to allow a somewhat gradual movement of the valve 2 and preclude violent fluctuations in the flow of fluid.

Each time that the motor 15 is energized, corresponding motion will be imparted through the worm and gear train 20 and 21 to the finger 24 to move it a short distance. No movement of the Geneva stop pinion 22 will take place, however, unless the finger 24 comes into contact with the pin 23. The next impulse of the motor 15 will move the finger 24 a further short distance so that it will require a considerable number of these periodical impulses reflected from the contacting mechanism to rotate the finger 24 a complete revolution. Assuming that the finger 24 has co-operated with the pin 23 of the Geneva stop pinion 22 to move the Geneva stop wheel 26 a fraction of a turn, represented by the width of one of the teeth in the wheel, it will be observed from the foregoing description that a complete revolution in either direction of the finger 24 will be required to cause a further movement of the wheel 26. As previously pointed out, both positive and negative corrections are made depending upon the direction in which the galvanometer needle moves from the central point in response to changes in the condition. Consequently, the finger 24 may be moved in either a clockwise or counter-clockwise direction without completing a revolution, and therefore without causing a movement of the wheel 26. When the Geneva stop wheel 26 is moved a fraction of a turn, this movement is transmitted through the worm and gear wheel 33 to the member 32, which screws the sleeve 33 up or down, depending upon the direction of the correction to be applied. This change in the position of the sleeve 30 changes the compression in the spring 31 and consequently effects a change in the equilibrium conditions between the fluid pressure and the diaphragm pressure and causes an opening or closing, as the case may be, of the valve 2 to an extent sufficient to establish equilibrium again. The changes which may thus be made in the setting of the valve 2 by movements of the Geneva stop wheel 26 constitute what may be termed the major corrections in the valve setting. These corrections effect a continuing change in the valve setting inasmuch as they are maintained until the motor 15 shall again have effected a major correction.

In the supply of the fluid to a system which may become stabilized, as for example in the supply of fuel to a furnace or the like, the system may more or less reach an equilibrium and consequently the number of major corrections may become quite infrequent and the finger 24 will move back and forth as minor corrections may be applied by the motor 15 through the gear pump 14, without effecting a movement of the wheel 26, since these minor corrections, as previously described, are preferably proportional to the change in temperature from that desired. The system is particularly efficient in closely maintaining a desired temperature without the positive and negative fluctuations or hunting inherent in other types of regulation.

Obviously many modifications and variations of the invention, as hereinbefore set forth, may be made without departing from the spirit and scope thereof, and therefore only such limitations should be imposed as are indicated in the appended claims.

What I claim is:

1. In a fluid supply system, a supply line having a diaphragm control valve located therein, pressure compensating means adapted to co-operate with one side of the diaphragm to maintain a substantially uniform head on the delivery side of the supply line, and a reversible pump actuated in response to changes in the value of a condition and connected to the delivery side of the supply line and to one side of the valve diaphragm, whereby fluid pressure may be increased or decreased upon said diaphragm to vary the fluid supply in accordance with said changes.

2. In a fluid supply system, a supply line, a diaphragm valve located therein and having a pressure compensating connection between the delivery side of the supply line and one side of the diaphragm, and a reversible pump for arbitrarily varying the fluid pressure on the same side of the diaphragm in proportion to the changes in the value of a condition.

3. In a fluid supply system, a supply line, a diaphragm valve located therein and having a pressure compensating connection between the delivery side of the supply line and one diaphragm chamber, a reversible pump connected on one side to the same diaphragm chamber and on the other side to a source of fluid supply, and means to actuate said pump in accordance with the changes in the value of a condition, whereby corresponding changes may be produced in the fluid supply passing through the valve.

4. In a fluid supply system, a supply line, a diaphragm valve located therein and having a pressure compensating connection between the delivery side of the supply line and one diaphragm chamber, a reversible pump connected on one side to the same diaphragm chamber and on the other side to a source of fluid supply, and means to actuate said pump in proportion to changes in the value of a condition from a predetermined value.

5. In a fluid supply system, a supply line, a diaphragm valve located therein and having a pressure compensating connection of regulable flow capacity between the delivery side of a supply line and one diaphragm chamber, a reversible pump connected on one side to the same diaphragm chamber and on the other side to a source of fluid supply, and means to actuate said pump in accordance with the changes in the value of a condition.

6. In a fluid supply system, a supply line, a diaphragm valve located therein and having a pressure compensating connection between the delivery side of the supply line and one diaphragm chamber, a by-pass in said connection, a reversible pump located therein, and means for actuating said pump in accordance with the changes in the value of a condition.

7. In a fluid fuel supply system, a furnace or the like, a burner for heating the furnace, a fuel supply line to the burner, a diaphragm valve located therein and provided with a pressure compensating connection between the delivery side of the valve and one diaphragm chamber, means to determine the changes from a predetermined temperature at a selected point in the furnace, means for minor regulation to vary the head of fuel delivered to the burner comprising a reversible pump connected on one side to a source of the fluid fuel and on the other side to the same diaphragm chamber, means to translate the changes in temperature into proportional periods of time for which said means for minor regulation is actuated, and a major regulating means adapted to integrate the actuations of the minor regulating means and apply a major change to the head when said integration reaches a predetermined sum, whereby the temperature in the furnace is maintained substantially constant.

8. In a fluid fuel supply system, a furnace or the like, a burner for heating the furnace, a fuel supply line to the burner, a diaphragm valve located therein and provided with a pressure compensating connection between the delivery side of the valve and one diaphragm chamber, a reversible pump connecting on one side to a source of the fluid fuel and on the other side to the same diaphragm chamber, means to operate said pump, means to determine changes in temperature at a selected point in the furnace and to translate such changes into proportional periods of time for which said first means is actuated, whereby the fuel supply is controlled and the temperature in the furnace maintained substantially constant.

In witness whereof I have hereunto set my hand and seal this 7th day of February, 1928.

LUIS DE FLOREZ.